United States Patent [19]

Strecker et al.

[11] Patent Number: 4,777,595

[45] Date of Patent: Oct. 11, 1988

[54] APPARATUS FOR TRANSFERRING BLOCKS OF INFORMATION FROM ONE NODE TO A SECOND NODE IN A COMPUTER NETWORK

[75] Inventors: William D. Strecker, Harvard; Robert E. Stewart, Stow; Samuel Fuller, Harvard, all of Mass.

[73] Assignee: Digital Equipment Corporation, Maynard, Mass.

[21] Appl. No.: 843,937

[22] Filed: Mar. 24, 1986

Related U.S. Application Data

[63] Continuation of Ser. No. 375,984, May 7, 1982, abandoned.

[51] Int. Cl.[4] .............................................. G06F 1/00
[52] U.S. Cl. .................................................... 364/200
[58] Field of Search .......................... 364/200 MS file; 364/900 MF file

[56] References Cited

U.S. PATENT DOCUMENTS

| | | | |
|---|---|---|---|
| 4,032,899 | 6/1977 | Jenny et al. | 364/200 |
| 4,156,798 | 5/1979 | Doelz | 364/200 |
| 4,200,930 | 4/1980 | Rawlings et al. | 364/200 |
| 4,412,286 | 10/1983 | O'Dowd et al. | 364/200 |
| 4,430,700 | 2/1984 | Chadima, Jr. et al. | 364/200 |
| 4,449,182 | 5/1984 | Rubinson et al. | 264/200 |

OTHER PUBLICATIONS

Takoro, M. & Tamaru, K.; "Acknowledging Ethernet" pp. 320–325.
Network Systems Corporation; "Systems Description; Series A Network Adapters".
Network Systems Corporation; Application Report Number 101; "Hyperbus Enhancers Multimini Computing".
Application Report Number 102; "Macrowaves and Hyperbus".
Application Report Number 103; "Hyperbus Improves Graphics Performance".
Introduction to the Tandem—16 Data Research Corporation; "Tandem Non-Stop Systems".

*Primary Examiner*—Gareth D. Shaw
*Assistant Examiner*—Danial K. Dorsey
*Attorney, Agent, or Firm*—Cesari and McKenna

[57] ABSTRACT

Method and apparatus for transfer of packet-type information from the memory (24B) of one node (14) in a computer network to the memory (24C) of another node (16) in the network. The invention is of particular utility in transfers over serial buses (e.g., 18). Packets are sent from a named memory buffer (25A) at a first node (14) to a named memory buffer (25C) at a second node (16), allowing random access by the first node to the memory of the second node without either node having to have knowledge of the memory structure of the other, the source and destination buffer names are contained right in the transmitted packet.

The first node (14) can both write to and read from the second node (16). An opcode (40A) sent in each packet signifies whether a read or write operation is to be performed. For reading from the second node, the opcode actually causes the second node to write back to the first node; in this situation, the second node, upon detecting the appropriate opcode, places the remainder of the received packet on a command queue (202), to be executed with the commands locally generated at the second node, without need for host interruption.

37 Claims, 9 Drawing Sheets

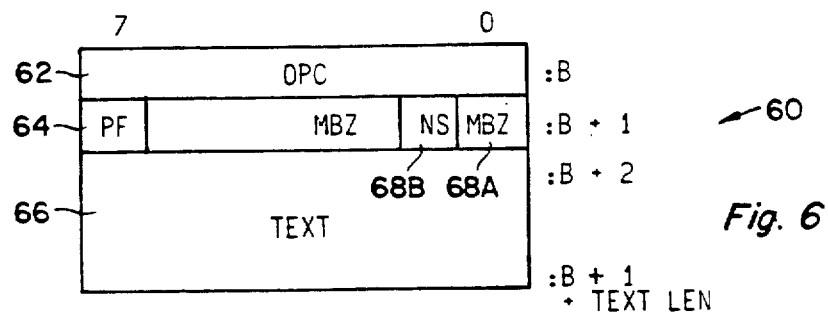
Fig. 6
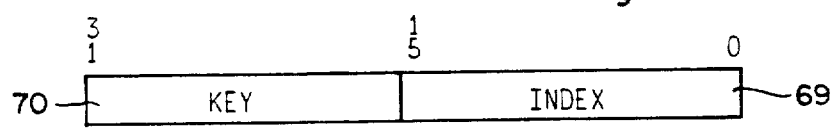
Fig. 7
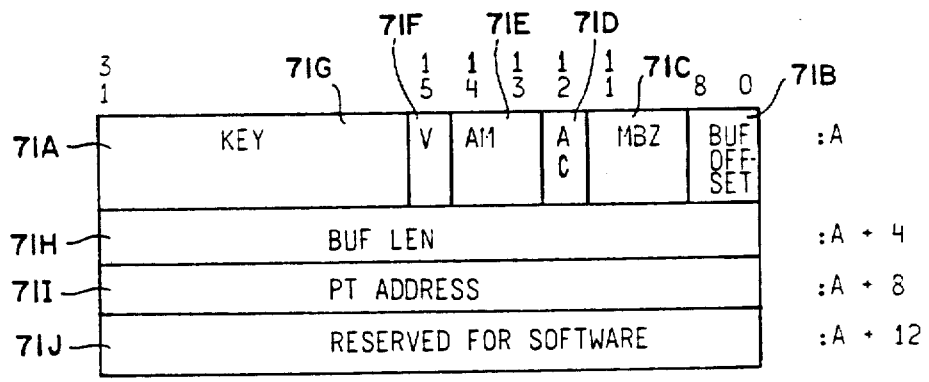
Fig. 8
Fig. 9
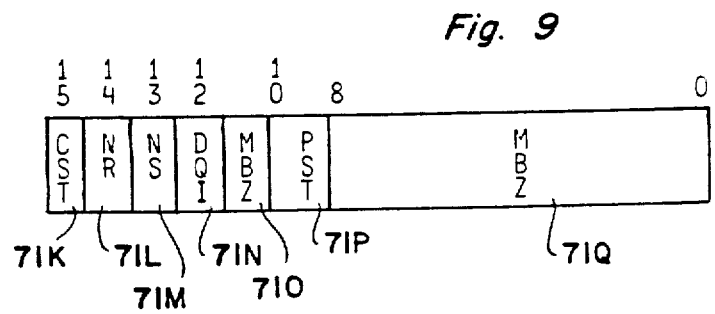

APPARATUS FOR TRANSFERRING BLOCKS OF INFORMATION FROM ONE NODE TO A SECOND NODE IN A COMPUTER NETWORK

This application is a continuation of application Ser. No. 375,984, filed May 5, 1982 now abandoned.

CROSS REFERENCE TO RELATED APPLICATIONS

The invention which is the subject of this Application is particularly useful in a system incorporating one or more of the inventions shown in the following commonly assigned applications, filed on even date herewith:

U.S. patent application Ser. No. 376,069, titled INTERFACE FOR SERIAL DATA COMMUNICATIONS LINK in the names(s) of Robert Giggi, John Buzynski and Robert Stewart; U.S. patent application Ser. No. 376,068, titled DUAL PATH BUS STRUCTURE FOR COMPUTER INTERCONNECTION, in rhe name(s) of William D. Strecker, David Thompson, and Richard Casabona; and U.S. patent application Ser. No. 375,983, titled DUAL-COUNT, ROUND-ROBIN DISTRIBUTED ARBITRATION TECHNIQUE FOR CONTENTION-ARBITRATED SERIAL BUSES, in the name(s) of William D. Strecker, John E. Buzynski and David Thompson.

To the extent necessary for understanding aspects of the present invention not fully explained herein, if any, and to the extent helpful to a more complete understanding of the utility or advantages of the present invention, the explanations contained in the aforementioned applications are hereby incorporated by reference, as though fully set forth herein.

FIELD OF THE INVENTION

This invention relates to the field of computer system interconnections and, more specifically, to an apparatus for transferring information from a memory associated with a first node in a computer network to a memory associated with a second node in the network.

BACKGROUND OF THE INVENTION

In a distributed computer network comprising a system of interconnected compuer nodes, information comprising commands, responses and data must be transmitted between two or more nodes and combinations of nodes in order to allow the various components of the system to interact.

Since the terminology involved in describing such a network is not fully formalized in the industry, it should be understood that as used herein, the following terms have the indicated meanings, unless it appears otherwise from the context in which used:

A "port", also called an "interface" or "adapter", is the mechanism through which a (host) computer or other device gains access to a bus for communicating with other computers and devices. A port includes a port processor, port buffer, and link components; the roles of these components is explained below.

A "node" comprises a host computer and at least one port; a node may also have or use multiple ports and these ports may also communicate with each other over the bus.

A "bus" is an interconnection between devices through which information may be transferred from one device to another; it includes a communication channel and associated components and control.

A "network" is a system of nodes interconnected via a common bus.

The mechanism employed for transferring information from one node to another (and from one port to another) significantly affects both the communications efficiency and the processing efficiency of the network. In the past, with rare exceptions, computer interconnection schemes have been designed either (1) to be mere communications channels or (2) to take into account the specific characteristics of specific models of equipment. However, with the proliferation of manufacturers and models of computer equipment, the need has existed for some time for an efficient, cross-product compatible, general purpose computer intercomputer communications link which is more than just a communications channel but is also more broadly useful than a product-specific bus. This need has become all the more acute with the advent of (1) so-called "intelligent" input/output systems which have significant computing capability of their own, (2) high availability systems structured as networks of closely coupled computers, each with its own independent memory and operating system and (3) load-sharing distributed processing systems where a number of tightly-coupled computers share a common resource, such as a file system.

The design of the message communications system for a multi-node network is highly dependent upon the kind of bus employed as the electrical interconnection. Such networks differ from each other qualitatively, and are characterized, by the way in which bus access is obtained and the way in which messages are directed from one point to another. This includes the method by which a message destination is indicated and recognized, the way message-handling tasks are controlled and the types of reliability enhancing and error-detecting and error correcting features employed. As a result of different design approaches, the operational sequence of steps necessary for accomplishing a message transfer may differ markedly from one network to another.

Computer networks broadly may be categorized as either tightly-coupled or loosely-coupled. Loosely-coupled networks are also called "distributed" networks or systems. In tightly-coupled networks there is generally one memory which is shared by different devices, such as processors, input/output devices, etc., and all are in close physical proximity. These different devices use the memory as a mailbox through which information can be exchanged, one device putting a message into the mailbox and another device taking it out. A memory bus interconnects the memory with the other devices. By contrast, in loosely-coupled networks, nodes containing the devices and subsystems mentioned above are usually separated by greater distances and cannot efficiently utilize a common memory bus. Therefore, the interconnection between nodes of such a network is often some sort of communications bus which simply acts as a communications channel. Distributed networks thus usually have different operating modes than tightly-coupled networks and require a greater number of steps to effect a transfer from one node to another. Also, a transmitting node normally has no knowledge of where in its memory a receiving node puts a particular message.

One form of communications bus, which also is the type used herein, is referred to as a contentionarbitrated bit-serial bus.

Other common drawbacks of prior art systems are (1) that sometimes only undirectional transfers are supported—i.e., only write operations, but not read operations—since memory of one node is not directly accessible from another; (2) messages may be lost at times; (3) long transfers may monopolize the bus for an unfairly long time; and (4) processor interruption is needed to signal completion of a transfer. Indeed, multiple interruptions of a host processor may be needed, sometimes as often as once per packet sent over the bus; and with each interrupt, the process or is diverted from other work and that other work is delayed.

Accordingly, it is an object of this invention to provide an efficient, cross-product compatible, general purpose intercomputer communications link for computer networks.

It is a further object of this invention to provide a message transfer system for distributed computer networks which closely simulates the performance of a tightly-coupled network.

It is another object of this invention to provide such a message transfer system wherein a transmitting node (and port) knows, at least symbolically, the location in the receiving node's (and port's) memory to which each message is sent.

It is also an object of the present invention to provide a new method and apparatus for message transfer between the nodes of a multi-node network using a contention-arbitrated bit-serial bus, with provision for insuring high reliability of information transfers.

It is a further object of this invention to provide such a network and apparatus in which message transfer is guaranteed to be non-duplicated, loss-free and error-free.

Yet another object of such invention is to provide a bi-directional interconnection capable of supporting both read and write operations between nodes of a multi-node network.

Still another object of this invention is to provide a non-atomic transfer service wherein a single transfer may be broken into blocks to prevent bus latency build up, so that long transfers do not block a port from start to finish of the transfer.

A further object of the invention is to support prioritizing of both read and write operations by the initiating node.

An additional object of the invention is to provide for general addressing of buffers in destination nodes, eliminating the need for the transfer-originating node to know in detail the memory addressing structure of the destination node.

A still further object of the invention is to provide a transfer apparatus and method in which the required number of host interventions or interrupts, is minimized (i.e., substantially reduced)

SUMMARY OF THE INVENTION

The foregoing and other objects and advantages of the invention are accomplished by a high speed data transfer method and apparatus which allows random access by a port originating a transmission to specifically named memory locations in a receiving (i.e., destination) port. The transmitting node and port need not have any knowledge of the actual memory structure (whether virtual or physical) of the receiving node and port.

All transmissions are accomplished between a memory buffer in a transmitting node and a memory buffer in a receiving node. These buffers are in actual memory at each node and are not to be confused with communications buffers which interface between the communications bus and the other elements in a node, within the data link of the port.

Each memory buffer is named and names are of a predetermined, fixed length. Mapping of memory buffer names to actual memory space is implementation-specific. Prior to a transfer, the names, offsets and lengths of buffers in other nodes are determined and exchanged through higher level protocols. The message packets of the present invention reference only the name, length (in bytes) and offset (i.e., location relative to the starting address of the buffer) into the buffer. Offset mapping is also implementation-dependent.

To write data from a first node to a second node, the first node puts an appropriate number of so-called SNTDAT packets onto the communications bus, each containing a part of the data and labelled with the name of the destination (i.e., receiving) buffer in the second node and the offset in the receive buffer for that particular packet. A transaction identifier unique to the group of packets also is transmitted, for use in the message confirmation process.

The last packet in a message is identified by a unique flag which is appended to it by the sending port. On receipt of this flag at the receiving port, the receiving port generates a command to itself, instructing itself to return a message to the sending port, confirming receipt. The confirmation message comprises the transaction identifier. This confirmation shows not only that that specific packet sequence was transmitted successfully over the bus, but also that it was intact when it reached the host computer of the receiving node (as opposed to just reaching the communications buffer) and that the confirmation is not one for another message which is erroneously assumed to relate to the message just sent.

Digressing briefly, note the use of terms to describe the nodes, ports and buffers according to their functions. A node or port starts out sending a message and, to complete the transaction, ends-up receiving a confirmation or acknowledgement; or its starts out receiving a message and then sends (i.e., transmits) a confirmation or acknowledgment back to the port from which the original message came. This duality of roles sometimes leads to slightly confusing terminology. To alleviate confusion, it should be understood that the same node or port may be referred to in different situations as, variously, the "sender", "initiator", "originator", etc., or, conversely, as the "receiver", "responder", etc. Buffers are usually referred to herein as simply "source" or "destination", depending on whether they are supplying or receiving information, respectively.

To read data from second node, a first port sends to the second node a special request packet (DATREQ) which carries the transfer length, and names and offsets of the source and destination buffers. The DATREQ packet causes the receiving (i.e., second) port to generate a WRITE command internally, and to write the requested information to the sending (i.e., first) port with return data (RETDAT) packets which are similar in format to the SNTDAT packets. The data is returned in as many packets as necessary by the second (i.e., responding or receiving) port. The last packet of the transfer is marked with a special flag signifying that it is the end packet of the transmission. This confirms to the sender that the transfer was both complete and successful.

To minimize the number of host interrupts, commands can be generated in the receiving port automatically, responsive to a basic command from the sending port, as in the case of generating a confirmation message or performing a READ operation. Thus, a command in a local port may be caused to be executed in a remote port without host intervention.

Although messages (both commands, responses and data) are transferred as packets, large blocks of data are not limited in size to a single packet. Thus a large block of data is broken into multiple packets which are individually transferred. In doing so, only the sending node need concern itself with the state of the transfer; the receiving node state is controlled by the "last packet" flag.

All operations are confirmed upon completion in the initiating port.

As discussed more fully below, communications are carried out via port-to-port virtual circuits. In the event of an error occurring during either a read or write transfer, the virtual circuit is closed in the port where the error was detected. This prevents completion of the transfer, though only the port where the error was detected is aware of it immediately. An exchange at a higher level protocol must be used to inform the other port involved and to re-initialize the circuit.

(Note that a virtual circuit is said to be "open" when it is usable and "closed" when it is unusable. This choice of language is unfortunate though accepted in the art, as it leads to confusion with electrical circuit terminology, wherein an "open" circuit is broken and a "closed" circuit is a valid path, but the terminology is not the inventors'.)

If a single transfer requires multiple data packets, they need not be sent consecutively and may be interspersed with other packets between the same pair of controllers. They should, however, be sent in order of increasing offset.

Data packet length is discretely variable. All the packets of the transfer except the last should be of an agreed-upon size and the last packet should carry the remainder and be less than or equal to the preceding packets in size.

This invention is pointed out with particularity in the appended claims. The above and further objects and advantages of the invention may be better understood by referring to the following description, taken in conjunction with the accompanying drawings.

BRIEF DESCRIPTION OF THE DRAWINGS

FIG. 6 is a diagrammatic illustration of the format of the body of a Message type packet according to the invention;

FIG. 7 is a diagrammatic illustration of the format of a buffer name according to the invention;

FIG. 8 is a diagrammatic illustration of a buffer descriptor according to the invention;

FIG. 9 is a diagrammatic illustration of the format of a Virtual Circuit Descriptor of the Virtual Circuit Descriptor Table according to the invention;

DESCRIPTION OF AN ILLUSTRATIVE EMBODIMENT

Figure 1:
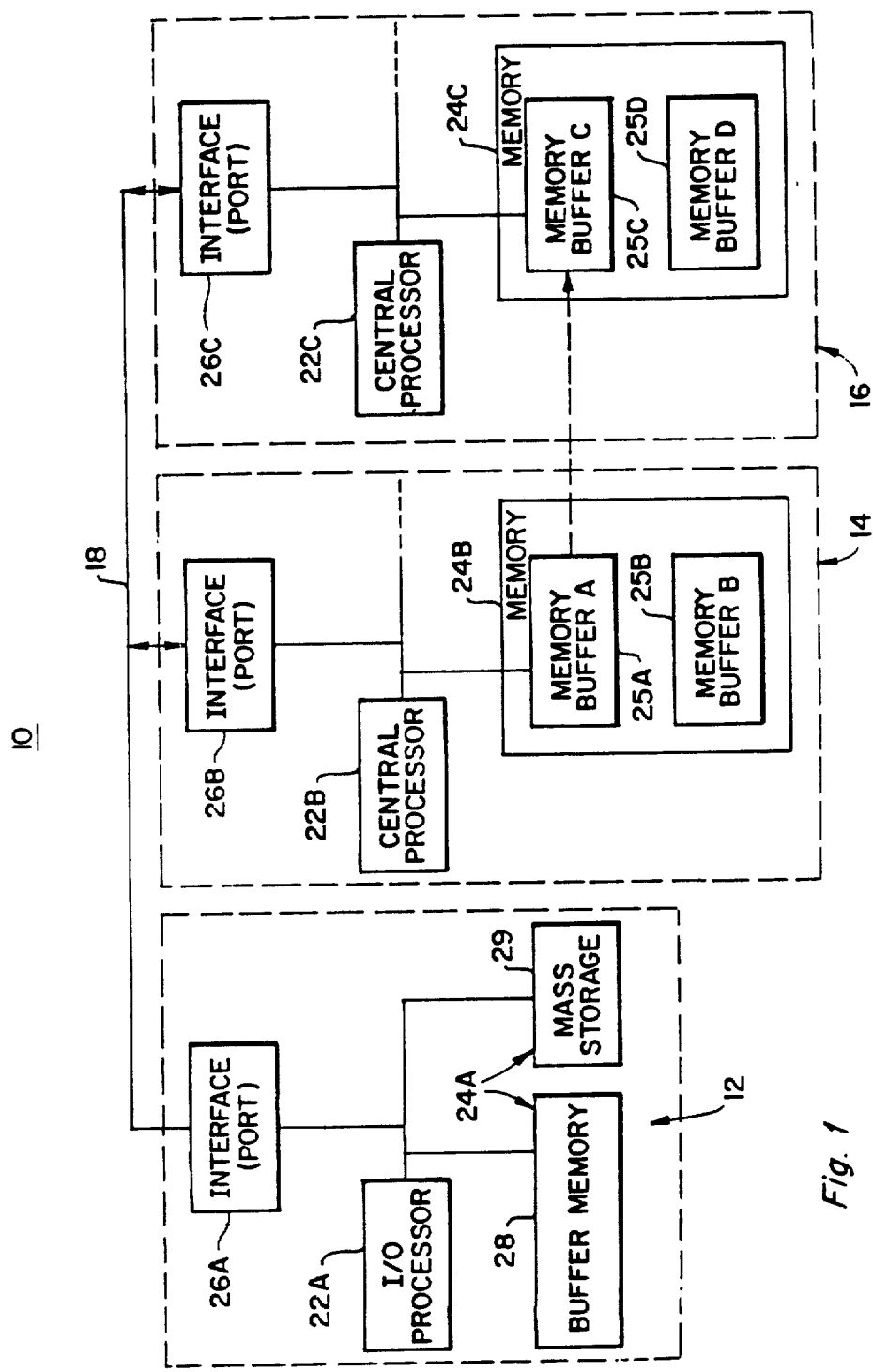
FIG. 1 is a block diagram of an exemplary network wherein the present invention would be useful.

FIG. 1 shows an example of a network 10 wherein the present invention would be useful. There, three nodes 12, 14 and 16 are connected by a bus 18. Node 12 is an intelligent input/output (I/O) node while nodes 14 and 16 are general purpose computers. Each node contains a processor (22A, 22B or 22C), memory (24A, 24B or 24C) and a bus interface or port (26A, 26B or 26C). Memory 24A of I/O node 12 is formed in two parts - an I/O system buffer memory 28 and a mass storage device 29; for purposes of this discussion, the mass storage device is not involved. Processor 22A, may include a controller for mass storage device 29. By contrast, memories 24B and 24C are primary memory units which, not being peripheral devices, do not need separate controllers.

Memories 24A, 24B and 24C contain memory buffers between which the exchanges described herein take place. For example, memory 24B is shown as having memory buffer locations 25A and 25B, while memory 24C is shown as having memory buffer 25C and 25D. At the highest conceptual level, the invention involves accomplishing a packet transfer from, for example, memory buffer 25A in a first node 24B to memory buffer 25C in second node 24C, as indicted by the dashed line between those memory buffers.

The host computer system at a node (i.e., the processor and memory) may, for example, be a model VAX 11/780 or other VAX computer of Digital Equipment Corporation, Maynard, Mass. Where references herein are made to specific propert or characteristics of a host (or of its memory, for example), that computer will be used as the basis for the reference. Suitable background information on such computers can be found in "VAX Architecture Handbook", published by Digital Equipment Corportion, to which reference should be made (for, e.g., a description of VAX memory mapping).

Each port, is identified by a unique addressing number. This may, for example, be an eight-bit identifier.

All communications between ports are packet-oriented. Each packet is framed by a special start character and by a byte count carried in the packet header. A 32-bit CRC (i.e., cyclical redundancy check) character is calculated and appended at the end of the packet for detection of transmission errors. Packets are integral numbers of bytes from about 10 to about 4,100 bytes in length, for example, excluding header and trailer fields. Each byte is transmitted bit-serially, using Manchester encoding, for example.

Figure 2:
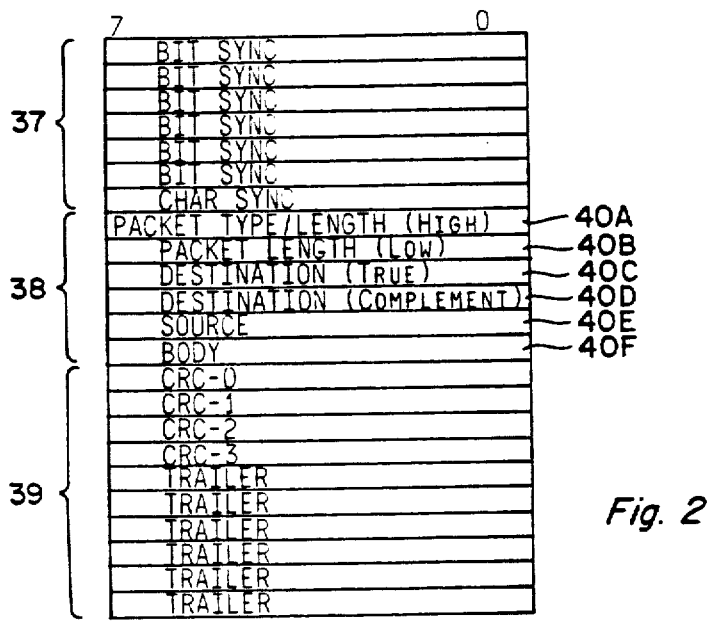
FIG. 2 is a diagrammatic illustration of the format of an information packet as passed between ports.

Information packets transferred over the bus 18 have the format shown in FIG. 2, wherein the first transmitted byte is at the top and the last, at the bottom. Each packet can be divided into three parts. The first part (i.e., header), 37, comprises a series of bit sync and character sync bytes. The second part is the informational section of the packet, 38. The third and last part of the packet, 39, contains the CRC character plus a sequence of trailer bytes. First and third packet portions 37 and 39 are supplied by link 36. Second, informational packet portion 38 is supplied by the packet buffers 34.

Packet portion 38 starts with an indication of packet type and some high order bits of a packet length field, 40A which carries over to subsequent byte 40B. The true and complement values of the destination node name 40C and 40D are sent next, followed by the source node name 40E. The actual body of the packet (i.e., data, command, response, etc.) is sent last in that part of the packet, 40F.

For an acknowledgment packet (see below), the format is the same except that packet length and packet body may be (and are) omitted as unnecessary.

Three major types of communications mechanisms are supported by this interconnection. The first, called "Datagram service," is the simplest, providing best effort (though not loss-free) delivery of single data blocks. The second, so-called "Message service" uses "virtual circuits" to provide a more reliable transfer of similar size data blocks. The third mechanism, "Block Data transfer service," moves longer blocks of data, also via virtual circuits.

Virtual circuits are well-known in the art and are well described in the literature, such as in Andrew S. Tananbaum, *Computer Networks*, Prentice Hall 1981. Each virtual circuit is constructed of a set of state variables in the sending and receiving ports. Virtual circuits ensure that packets are delivered loss-free, duplicate-free, sequentially and error-free. "Loss-free" means that the packet is guaranteed to be delivered to its destination. "Duplicate-free" means that a packet is not received a second or subsequent time once delivery is successful. "Sequential" delivery ensures that data is delivered in the same order as that in which it was sent. "Error free" delivery means that data will not be corrupted.

Virtual-circuit-controlled Message service delivery is sequential, non-duplicated, and error-free; the loss-free characteristic is not used.

"Block Data transfer service" is used to move large blocks of buffer data directly from one memory to another (DMA). This is done by dividing such large blocks into multiple sub-blocks and (non-atomically) transferring them in separate packets. The Block Data service uses the same virtual circuits as the Message service and is therefore guaranteed sequential and error-and loss-free.

Acknowledgment of packets is immediate; that is, bus time is reserved immediately after each packet is sent for the receiver to transmit an acknowledgment back to the originator. The type of acknowledgment depends on the result of the transmission. If any error in the packet was detected, no acknowledgement is sent; the transmitter detects the problem by an expiration of a timer. If the packet was correctly received and buffered (at least in the interface), a positive acknowledgment (in the form of special "ACK" packet) is sent to the originating port. If the packet is correct but the interface is unable to buffer it, a negative acknowledgment packet ("NAK") is returned. Retransmission occurs if the response is anything other than a positive acknowledgment; such retransmission follows a defined algorithm. The algorithm is designed such that if failures are detected at the timing limits, it is very likely that a hardware failure has occurred.

Figure 3:
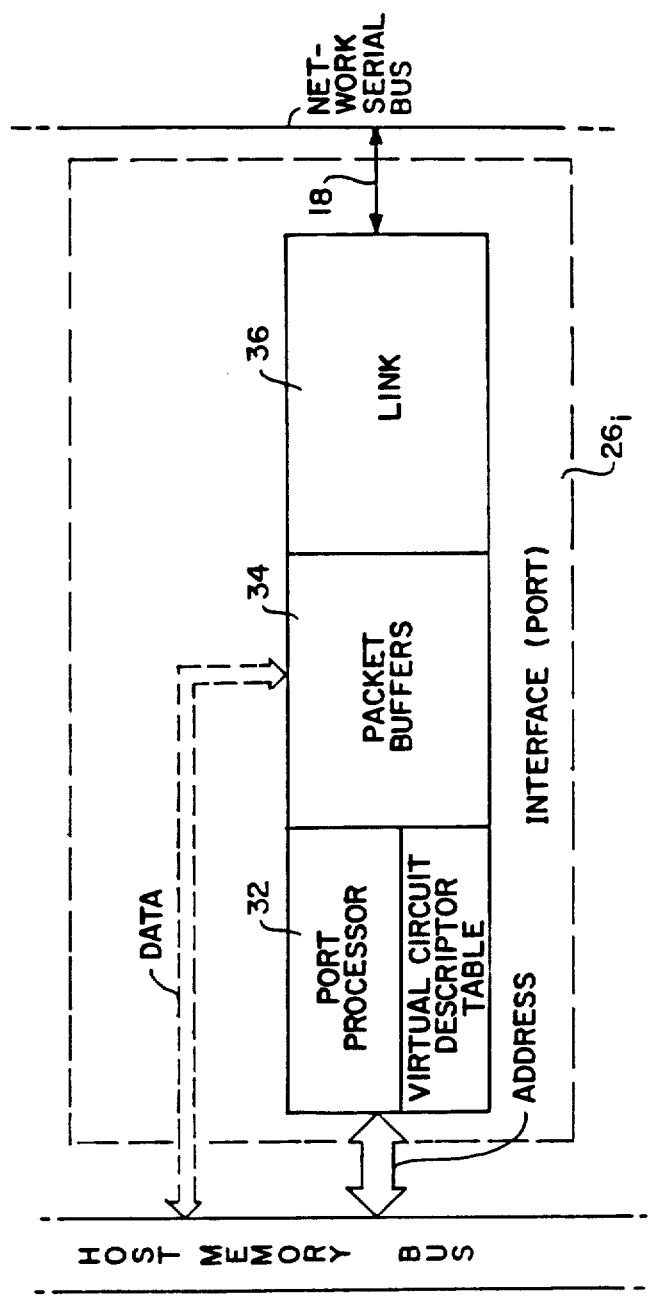
FIG. 3 is a high-level block diagram of the functional components of an interface according to the invention.

Each bus interface consists of three functional components, as indicated in FIG. 3. These three components are a port processor 32, packet buffers 34 and a link 36. The port processor 32 interfaces to the node's host memory (such as memory 24a, 24b, or 24c) via the host's memory bus, and controls the link 36 and packet buffers 34. The port processor 32 is responsible for data mapping, address translation, buffer loading, packet interpretation, and control of the host-port interconnection. The packet buffers 34 are a temporary storage interface between the link 36 and the port processor 32.

It is not imperative that the buffers be large enough to hold full packets statically. For example, the buffer might actually be a small first in-first out (FIFO) stack. If an implementation does not fully buffer packets, though, it must be highly likely that the data can be accepted for the entire packet at the bit transfer rate of the bus. The effective bandwidth of the bus can be greatly reduced if ports lose a high percentage of packets due to buffer overflow and retries are then needed.

Link 36 is responsible for the implementation of most of the data link protocol and moving the data between the bus 18 and the packet buffer 34. It includes a front end portion which performs the bit level operations of encoding/decoding and carrier detection. A good description of link 36 is contained in the aforementioned application Ser. No. 376,069, incoporated by reference here.

Architecturally, a full description of intercomputer communications over the bus involves specification of three layers. The bottom layer, termed the "physical channel", includes a description of the transmission medium, bit encoding/decoding and carrier detection function. The middle layer, termed the "data link", encompasses the functions of data packetization and bus control (i.e., arbitration and acknowledgment). The top layer, called the "port processor layer", is the level at which the protocols are specified for port-to-port communications; it provides the highest level communications mechanisms. The interface of the host port to the next higher layer is implementation-dependent and beyond the scope of this specification, as it varies with the host computer system at each node.

To the extent possible, the specification of the internal function of each layer is intended to be independent of the other layers, such that implementation changes within a layer are effectively isolated. In practice, however, it is recognized that hardware/firmware/software tradeoffs may not dictate such a separation. Ideally, information used in one layer is ignored and untouched by all the lower layers through which it is passed. Information that is used by a layer is "peeled off" before passing to a higher layer. The exceptions to this are in addressing and framing. Framing at the port processor layer is implicit in the data link framing. Addressing information is also used by both the data link and port processor layers.

As stated above, the Message service provides sequential, error-free delivery service via port-to-port independent virtual circuits. The virtual circuit state is maintained in each port on a per-port basis for all active ports. The state of each circuit consists of one bit indicating that the circuit is open (i.e., on) or closed (i.e., or off) and two single-bit sequence numbers, one for transmitting message packets and one for receiving message packets. Before a message can be sent successfully from one port to another, the corresponding sending and receiving sequence numbers must be equal and the circuit open. This is accomplished by a higher-level protocol. The Message mechanism is only to be used for "trustworthy" or highly predictable communications, since errors of any type result in circuit closure and therefore require reinitialization.

The Block Data transfer mechanism provides a reliable, multiple-packet transfer service for moving blocks of data from a buffer in one node to a buffer in another node. This mechanism uses the same port-to-port virtual circuits used for Messages, guaranteeing sequential, non-duplicated transfers. Data transfers can be accomplished in both directions, namely a "read" and a "write" with respect to either one of the ports. The buffers are named and the name of each must be passed to the other node, under prior agreement by a higher-level protocol. Any errors in the Block Data transfers close the virtual circuit, disabling both Block Data and Message communications.

The data link layer provides the port with reliable delivery of single packets across the physical channel. This, of course, is a packet property only and says nothing of what becomes of a packet(s) beyond the data link layer; it is also independent of the virutal circuit characteristics. It performs packetization of blocks of data and channel access control. The packetization includes framing, addressing and integrity checking. Framing is accomplished by marking the beginning of the packet with a special character, called the character sync. The end of the packet is determined by a packet length indication, which is included in the packet and immediately follows the character sync. Addressing is accomplished by following the packet length with the destination port address. The address is the port number. Each port has one address which is unique on the particular bus to which it is connected. A second copy of the destination port address is sent in complemented form to increase the reliability and preclude single component failure sources. The source port address is carried also, to allow the destination port to return an acknowledgment.

Packet integrity is checked by means of the aforesaid 32-bit cyclical redundancy check (CRC) character is computed from the packet contents and appended to the packet by the sending interface. Upon receipt of the packet, the computation is repeated on the received packet body and the result checked against the value sent with the packet. If the comparison reveals matching CRC characters, the probability is high that the packet was, in fact, correctly received. Channel access and control consists of arbitration, acknowledgment and retransmission (if necessary). The preferred arbitration mechanism is disclosed in commonly assigned U.S. patent application Ser. No. 375,983, titled Dual-Count, Round-Robin Distributed Arbitration Technique for Serial Buses.

According to the present invention, a port receiving the packet immediately acknowledges receipt. At the conclusion of the transmission of a packet, all ports wishing to transmit are required to wait a minimum time for the packet's destination port to return an acknowledgment packet. The nature of the acknowledgement is dependent on the results of the transmission. If the packet was not successfully received (e.g., due to a collision, a bus error or busy receiver), there is no acknowledging transmission and the originating port detects this by timing out on the acknowledgment receipt interval. If the packet was successfully received and buffered in the destination port, a positive acknowledgment (ACK) packet is returned. If the packet was correctly received but the interface was unable to buffer it, a negative acknowledgment (NAK) is returned.

In the case of transmission failure, the sending port makes an equal probability decision immediately to arbitrate and transmit or to wait a delay time before doing so. If delayed, the same decision is made at the end of the delay period. This is repeated until retransmission occurs. This random delay (exponentially distributed) is used to break possible deadlock situations. See the aforementioned U.S. patent application Ser. No. 375,983.

The physical channel layer is the interface between the data link layers of two ports. The data packet is conditioned and sent out on the bus by line drivers to be received on the other end at the destination port. The data, address, CRC, header and trailer components of each packet (see FIG. 2) are assembled together when the packet is passed to the physical channel. This layer performs media-specific tasks in transferring the data over the bus. Included are generating the data clock, encoding the data with the clock, decoding the data and separating out the clock, driving and receiving from the media, generating the carrier-detection logic signals and transporting the data signals from port to port. This layer provides the electrical compatability between port/nodes and a dependable means of data transport. Preferred carrier detection, clock isolation and clock/separation circuitry are illustrated in the commonly assigned patent application Ser. No. 376,069, titled INTERFACE FOR SERIAL DATA COMMUNICATIONS LINK.

Figure 4:
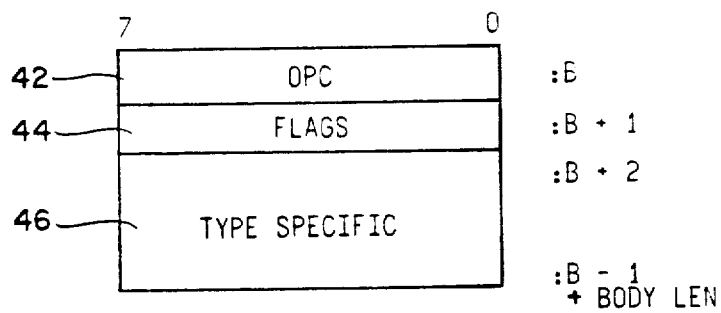
FIG. 4 is a diagrammatic illustration of the body of a packet of FIG. 3.

The general format of the body of a packet is illustrated in FIG. 4. As shown there, the packet body consist of a first byte 42, containing an opcode (OPC), a second byte 44 containing flags which comprise special miscellaneous code modifiers and then a series of bytes 46 containing packet type specific information. The parameters passed to and from the data link layer with each packet body are designated as DST, SRC, BODY LEN and status. DST denotes the port number to receive the packet (i.e., the destination) if transmitting, or the number of the port if receiving. SRC refers to the number of the originating port if sending a packet (i.e., the source) or to the number of the port which sent the packet when receiving. BODY LEN denotes the length of the body of the packet, in bytes. As it is type specific, the value is specified for each type of packet. The actual packet length, in bytes, may differ from the BODY LEN value by a predetermined amount. STATUS denotes the packet status which is passed with received packets and returned subsequent to transmission of those packets.

SEQUENTIALITY AND PRIORITY

The operations of the port (both those initiated by the port driver and those initiated by the received packets)

are performed at multiple priority levels. This reduces the latency of performance-critical transactions. Of course, real-time response can not be guaranteed since latency will be primarily a function of network load. However, this mechanism can be used to disproportionately provide bandwidth as desired. Sequentiality must be preserved on a per-packet basis between port pairs. Prioritization is performed for each packet, but may, in fact, be limited by pipelining of the implementation. The only guarantees of prioritization are performed on a prior-operation basis. Operations are service-specific, but consist of sending a specific packet unless otherwise specified.

The following set of rules defines the sequence in priority of operations:

If, while an operation of a first priority is being performed, an operation of a greater priority becomes available to the same port, the best effort is made to preempt the lower priortity operation between packets to perform the higher operation in its entirety, and to then resume the lower priority operation. The best effort is limited to four packets; that is, no more than four packets of the lower priority operation are transmitted after the higher priority operation becomes available.

Any number of priority levels can be employed. Provision for four priority levels has been found desirable.

VIRTUAL CIRCUITS

A virtual circuit is the mechanism used to provide a higher quality of service for a series of packets. As stated above, delivery of packets under virtual circuit control is guaranteed to be loss-and error-free, sequential, and non-duplicated. The circuit is constructed of a set of state variables in the sending and receiving ports. Virtual circuits are maintained on a per-port basis. That is, each of a pair of ports has a virtual circuit state with respect to the other ports. Therefore, in each port an array of state values is maintained, with one set per port "connected" by a virtual circuit.

Several of the communications mechanisms specified in the port use virtual circuits. In fact, the same circuit is shared simultaneously by any of the mechansisms that are in use. The circuit guarantees are on a per-packet basis, independent of the particular packet type (as long as that type uses the circuits). The state of a circuit consists of three bits in each port: Circuit State (CST), Sending Sequence Number (NS) and Receiving Sequence Number (NR). The circuit state (CST) bit reflects whether or not the particular circuit has been initialized. Its values are OPEN (initialized and "on") and CLOSED (uninitialized and "off"). The bit value representing each state can be implementation-dependent, with suggested values being 1 for Open and 0 for Closed.

The Sending Sequence Number (NS) is the number of the next packet to be sent (or the value of the current packet for which delivery is being attempted). The Receiving Sequence Number is the number of the next packet to be received. On the sending end, when the packet is to be delivered, it is loaded with the current NS value in the defined bit of the FLAGS field 44. When the data link returns successful transmission status, the NS value is incremented modulo 2 (i.e., complemented). In the receiving port, when a packet is received for a circuit, the value of the NS bit of the FLAGS field is checked against the current value of NR. If equal, the packet is accepted and NR is complemented. If not, the packet is discarded. This is the mechanism for discarding duplicates. If an acknowledgment (at the date link level) is lost due to bus error, the sending end retransmits the packet. If the packet actually was received and only the acknowledgment was corrupted, NR will have been complemented and the packet accepted. Upon receipt of the retransmission, NS will not equal NR and the second packet (a duplicate) will be discarded, although acknowledged at the data link layer.

The circuit state determines whether or not packets may be sent or accepted on the circuit. If the circuit is closed in the sending end, no virtual circuit packets may be sent for that circuit. If the receiving port state is closed, then incoming virtual packets for that circuit will be discarded at the port level. The circuit state should be closed if a transmission of a virtual circuit packet fails. Additionally a port may close its circuit at any time. In general, any type of error that may interface with sequentiality should result in circuit closure.

DATAGRAMS

All ports provide bi-directional, general purpose datagram service. Nodes must be able to handle a predetermined minimum datagram text length. In this example, that minimum is 58 bytes. Larger values up to some predetermined maximum, such as 4089, bytes may be used between ports based on prior agreemnnt. The prior agreement on increased size limits is left to a higher level protocol.

Figure 5:
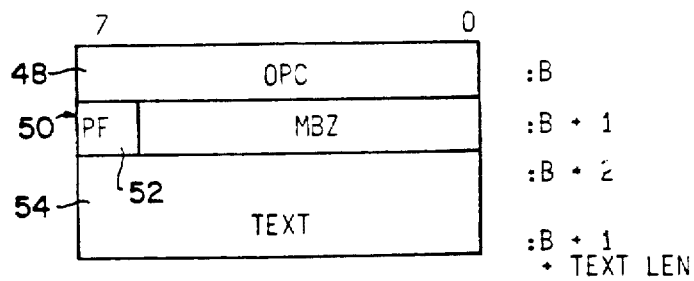
FIG. 5 is a diagrammatic illustration of the format of the body of a Datagram type packet according to the invention.

The body format of a datagram is shown in FIG. 5. As illustrated there, the first byte 48 of the datagram body contains an opcode (OPC) signifying a datagram. In a second byte 50, the lower 7 bits must be zero (MBZ) and the most significant bit 52 contains a packing format flag PF, implying the type of data packing (i.e., 512 or 576 bytes per block); it is useful for certain types of ports. The remaining bytes 54 comprise a text field containing datagram text which is passed to the port layer. Thus, for datagrams, the body length (in bytes) is equal to the text length (in bytes) plus 2.

MESSAGES

The Message mechanism provides a highly reliable delivery of single packets using the virtual circuits. Messages can be of varying length, ranging from 0 to some upper limit (e.g., 4089 bytes) in textual length. The maximum size message that may be exchanged between ports is determined by prior agreement and at a higher level protocol. However, any ports capable of receiving Messages must be able to receive Messages of at least the above-mentioned textual length of, for example, 58 bytes.

The body format 60 of packets of Messages is illustrated in FIG. 6. Such format comprises a first byte 62, a second byte 64 and a plurality of bytes 66; the latter comprise a variable length message text field. First byte 62 contains an opcode (OPC) signifying that the packet is a message packet. Second byte 64 is subdivided into four fields. The least significant bit 68A must be 0 i.e., MBZ). The next bit 68B contains the Sending Sequence Number; it holds the current value of NS for the destination port of the circuit. The next five bits, field 68C, must be 0. The most significant bit, 68D contains a packing format (PF) flag implying the type of data packing to be used by certain types of ports.

DATA TRANSFERS

The data transfer mechanism of the present invention provides for the transfer of large blocks of data not limited in size to a single packet. There are, of course, some upper bounds on the number of packets which can be accommodated based on buffer size. A block of data is broken into multiple packets which are individually transferred by the data link layer. The state of the transfer is maintained on the end sending the data. Both read and write operations are provided, and each is confirmed upon completion in the initiating port.

All packets involved in data transfers are sent on virtual circuits to provide a high quality of service. Data transfers reference named buffers of predetermined length. The mapping of buffer names to actual memory space is implementation-specific. The transmitted packets reference only the name, length (in bytes) and offset (32-bits each) into the buffer. The offset mapping is also implementation-dependent. Offset determines where in a buffer the data of the packet is to be placed or taken from. Buffer name values, offsets and lengths must be determined prior to the transfer, through higher level protocols. Such protocols are not part of this invention and therefore will not be discussed in any greater detail.

To write data, a port merely sends the packets of the transfer to the destination port, using the appropriate opcode. The last packet of the transfer is marked with a special flag. Upon receipt of such a packet, if the transfer was successful, the receiving port sends back a special confirmation packet which indicates that status. To read data, a port sends a special request packet which carries the transfer length and the names and offsets of the source and destination buffers. The receiving port responds as though it were writing data to the requesting port. The last packet of the transfer is again marked with a special flag. This is the confirmation to the initiator that the transfer was complete and successful.

As will be seen further below, the special request packet generated by the read operation includes a direction to the receiving port instructing it to send a write data operation back to the originator. Thus, the write operation is effected by the originator in a remote port. The read operation capability is therefore obtained with virtually no additional cost once the write operation is available. And there exists a generalized capability of sending commands to remote ports for direct execution there without bringing the remote host into play; this is particularly useful, for example, for diagnostics.

Any errors in completing either read or write transfers result in virtual circuit closure in the port where detected. The closed circuit prevents completion of the transfer. Only the port where the error was detected is aware of it. Higher level protocols must be used to inform the other involved port of the error, if necessary, and to reinitialize the circuit.

The data packets of a single transfer need not be sent consecutively. They may be interspersed with packets of another transfer, as explained above.

BUFFER DESCRIPTOR TABLE

Named memory buffers are defined by buffer descriptors in a Buffer Descriptor Table (BDT). A buffer name is a 32-bit value (for example), which may have the format shown in FIG. 7. As indicated there, the lower 16 bits (69) are used as an octaword index intothe BDT. The higher order 16 bits (70) are a field which acts as a "key". The key must match a corresponding key field in the buffer descriptor. The use of this interlocking key reduces the probability of an incorrect access of a buffer.

To open a buffer, the port driver fills in the appropriate fields of the buffer descriptor and sets the Valid (i.e., "V") bit (see below). At this point, the buffer description and the associated buffer mapping PTE's (i.e., Page Table Entries) are "owned" by the interface.

To close a buffer, the port driver clears the V-bit and insures that the interface does not have any internally cached address translations for that buffer.

The format of a buffer descriptor is illustrated in FIG. 8. There first longword (i.e., four 8-bit bytes) 71A is divided into six fields. First field 71B, comprising the lower nine bits, contains a buffer offset (BUF OFFSET) value indicating the starting byte of the buffer relative to byte 0 of the page defined by the PTE whose address is given by the PT ADDRESS field in the buffer description (see below). The next field (71C) bits 9–11 must be zero. Twelfth bit 71D comprises a one-bit Access Control (AC) field. The next two bits provide an Access Mode (AM) field 71E; the latter specifies the mode to be checked against the PROT field of the PTE of the host computer, for access control. Bit 15 is a onebit Valid (i.e., "V") bit field 71F. If it is set, the buffer is opened and the remaining fields must contain valid information. The rest of longword 71A is a buffer KEY field 71G, as outlined above.

Second longword 71H contains the buffer length (BUF LEN), in bytes. Third longword 71I, labelled PT ADDRESS, contains the system virtual address of the bases of a vector of PTE's mapping the buffer. Fourth longword 71J is reserved for software and is ignored by the port.

VIRTUAL CIRCUIT DESCRIPTOR TABLE

The interface implements virtual circuits between the host memories associated with pairs of ports, for sequenced transfers. For commands in the same command queue (see below), sequential communcation is guaranteed. Sequentiality is not guaranteed across command queues, however, with the exception that if a command is inserted on a higher priority command queue before another command is inserted on a lower priority command queue, the former is executed first.

The state of the virtual circuits is stored in a Virtual Circuit Descriptor Table (VCDT). The VCDT contains one Virtual Circuit Descriptor (VCD) per interface in the network (including the local interface for that node). The VCD, whose format is shown in FIG. 9, consists of five information fields: Circuit State (CST), Send Sequence Number (NS), Receive Sequence Number (NR), Datagram free queue inhibit (DQI), and Path Status (PSTS). The latter two fields are not part of the virtual circuit state and appear in the VCD for convenience.

Circuit State field 71K indicates whether the circuit is open ("1") or closed ("0"). PSTS field 71P indicates the condition of the bus path or paths. For example, if zero, both paths of a two-path system are bad; if one, a first path is good; if two, the other path is good; if three, both paths are good.

A packet to be sent on a circuit carries the NS value from the sending port's VCD. When the packet is acknowledged, the sending port's NS value is complemented. If the command sending the packet fails, the circuit is closed by the sending port clearing the CST bit. Subsequent commands attempting to send on the same circuit fail with virtual circuit closed status. Once a packet is sent on a circuit, no other packet is sent on the circuit until an acknowledgemnt is returned.

Incoming packets on a circuit carry the NS value from the sending port's VCD. This value is compared to the NR value of the receiving port's VCD. If they are equal, the packet is accepted and NR is complemented. If they are not equal, the packet is discarded, presumably as a duplicate due to a lost acknowledgment.

If the circuit for an incoming packet is closed, the packet is discarded. The sending side must detect this through a higher level protocol.

Figure 16:
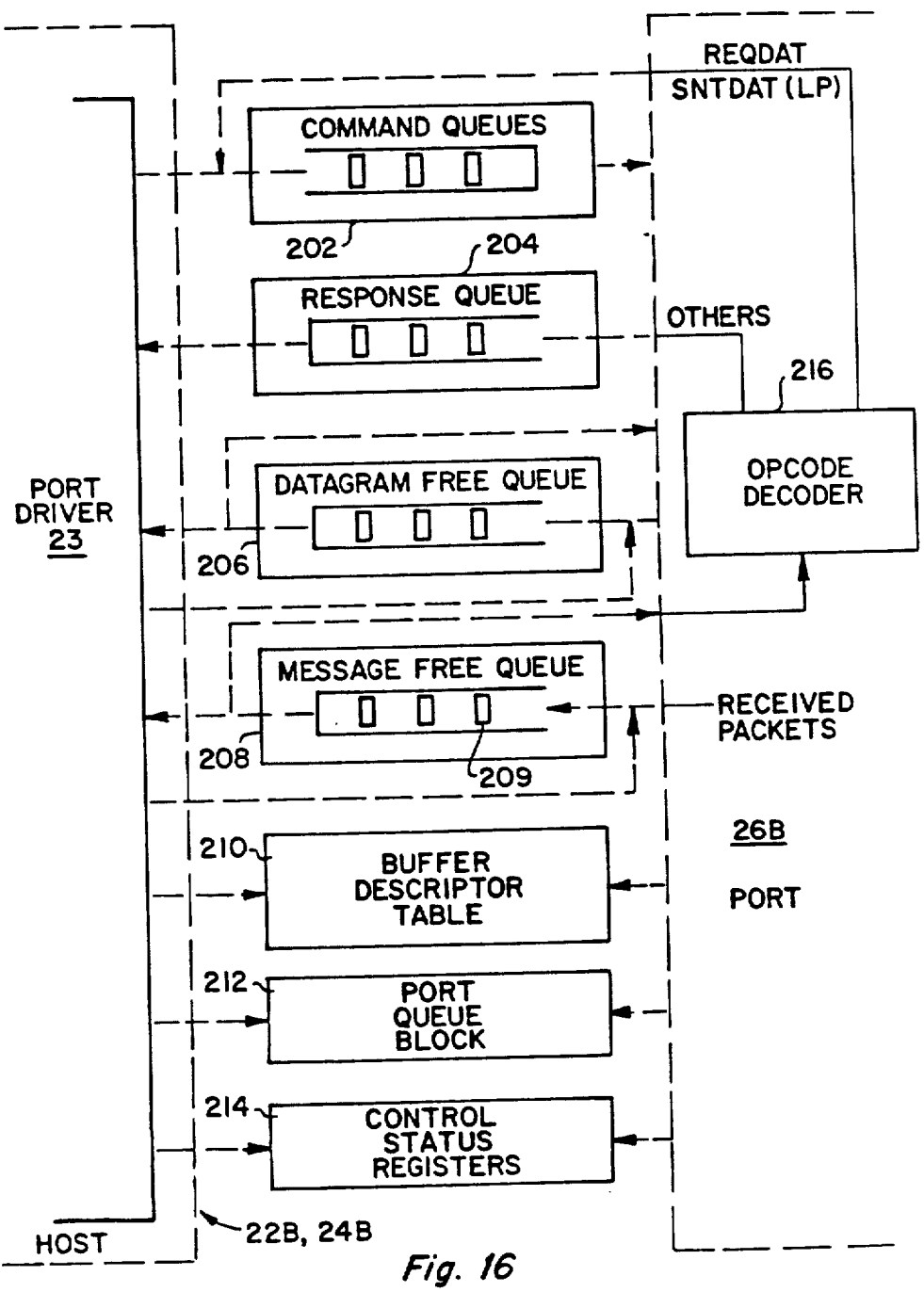
FIG. 16 is a diagrammatic illustration of the port-port driver interface of the invention, showing how the architecture is employed to provide remote execution of instructions.

The architecture of the interconnection system overall involves nine structural elements (see FIG. 16): (1) a port 26B, as described herein and in the other above-referenced applications; (2) a port driver 23—i.e., host computer software for controlling the port; (3) command queues 202—i.e., queues used by the port driver to give commands to the port; (4) a response queue 204—i.e., a queue used by the port for giving responses to the port driver; (5) a Datagram free queue 206—i.e., a queue used by the port as a place to put command queue entries not inserted in the response queue and as a source of queue entries for responses resulting from received packets; (6) a Message free queue 208—i.e., a queue like the Datagram free queue but for sequenced or Message type commands and responses; (7) a Buffer Descriptor Table (BDT) 210—i.e., a table of named buffer descriptors used to move data directly between bus packet and virtual address space buffers; (8) a Port Queue Block 212—i.e., a data structure used by the port and port drive containing command and response queue headers, pointing to free queue headers, sizes of free queue entries, and addresses and lengths of virtual memory mapping data structures; and (9) control/status registers 214. These are illustrated in FIG. 16, discussed below. The command queues, response queue, Datagram free queue, Message free queue and Buffer Descriptor Table are memory-resident structures addressed in each host computer system's virtual address space. The Port Queue Block is a memory-resident structure addressed physically. The control/status registers are in the I/O address space.

The command queues provide a memory stack for holding commands prior to execution. When a command reaches the head of a command queue, it is removed and executed by the port. Entries on higher-numbered command queue entries have priority over entries on lower-numbered ones, by convention. No command on a lower priority command queue entry will begin executing while a higher priority queue is non-empty. And if a command is inserted on a higher priority command queue while there is a command executing on a lower priority entry, the latter command will (a) complete transmission of the current and any other internally buffered packets (including all retries) or (b) suspend execution if additional packets need to be sent. In the latter event, command execution resumes once the commands on higher priority queue entries have been executed.

A response given to the port driver by the port via the response queue 204 is either (1) the queue entry of an executed command or (2) a queue entry resulting from receipt of a packet on rhe bus. When the port driver inserts an entry on an empty response queue, it requests an interrupt.

If the port finds the Datagram free queue 206 empty, it discards the packet. Datagram free queue entries are for unsequenced or datagram type commands and responses.

With respect to the Message free queue 208, the port requests an interrupt if it finds that queue empty while attempting to remove an entry.

WRITING DATA

Figure 10:
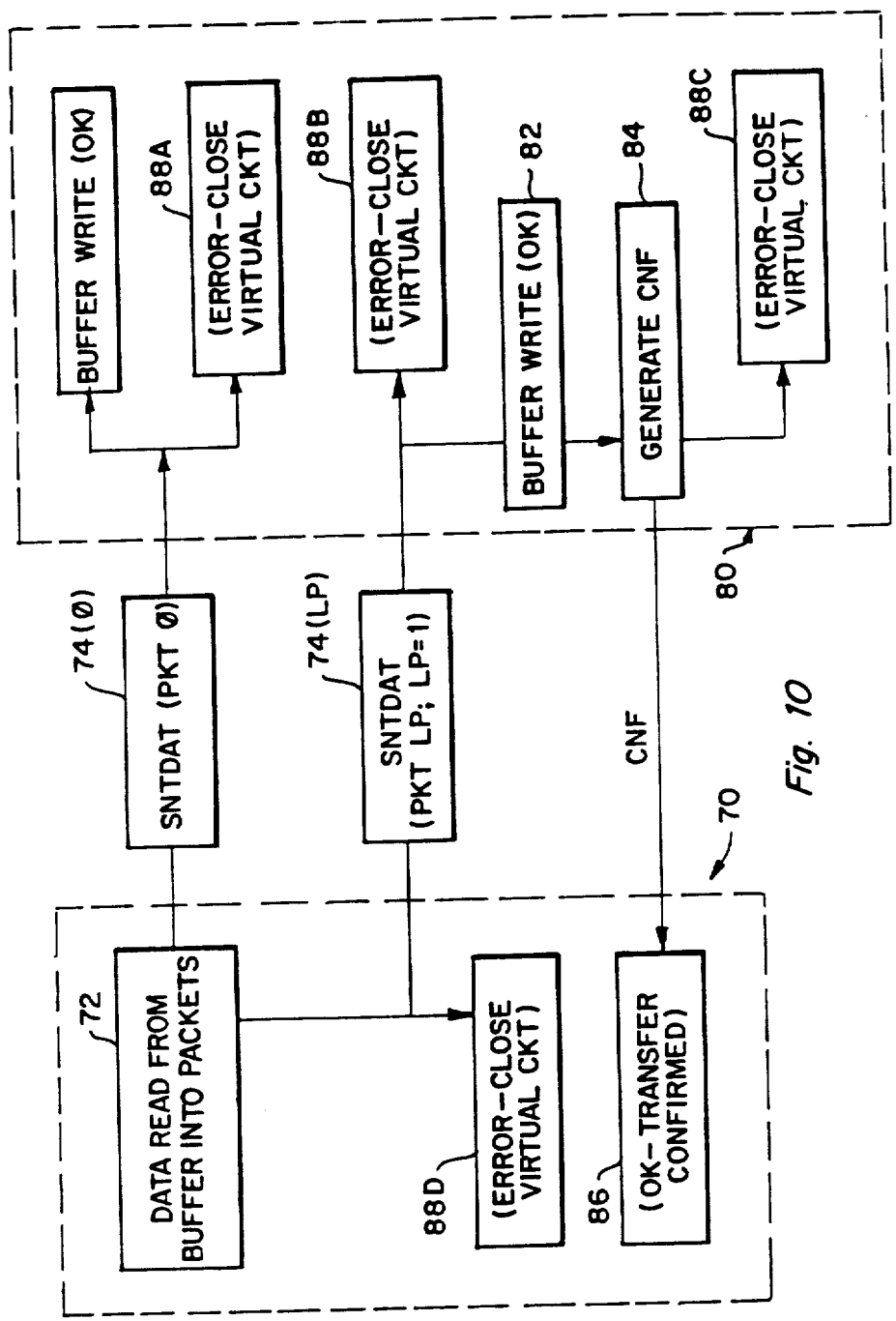
FIG. 10 is a flow diagram illustrating the process of sending (i.e., writing) data from one port to another.

The operation of writing data from one port to another is best explained with reference to FIG. 10. As shown there, the originating port 70 which desires to transfer data first reads that data from its memory buffer into the interface's packet buffers 34, which breaks the data into appropriately sized packets. Step 72. These packets are sent as a particular packet type, termed Sent Data (SNTDAT) packets over the bus 18. These are show as packets 74(0) through 74(LP). Packet 74(LP) is the last packet of the transfer and contains a special flag called the Last Packet (LP) flag, to indicate that significance. Each packet 74(i) carries a destination buffer name and offset which determines where the data is written in the receiving/responding node.

In the port 80 receiving the packets, the receipt of a SNTDAT packet with the LP bit set indicates conclusion of the transfer. If no errors have occurred, a condition determined at step 82, a confirmation (CNF) packet is sent back to the port which sent the data (step 84). On receipt of the CNF packet, step 86, the initiating port knows that the transfer was successful. If an error occurred at any time in receiving the data or sending the CNF packet, the virtual circuit must be closed, thereby preventing completion of the transfer. Steps 88A, 88B, 88C and 88D.

The operation returning the CNF packet should preferably occur at a predetermined priority sufficient to insure its prompt communication.

Figure 11:
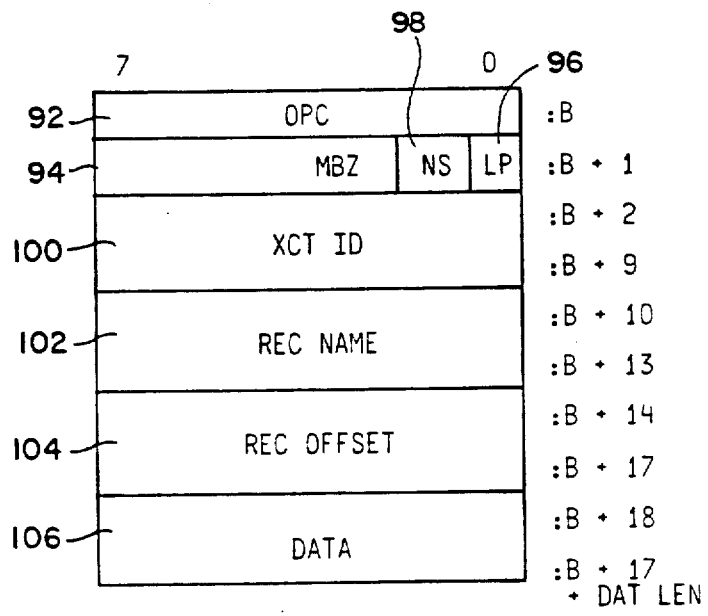
FIG. 11 is a diagrammatic illustration of the format of the body of a packet for sending (i.e., writing) data from one port to another.

The body format of a suitable exemplary SNTDAT packet is illustrated in FIG. 11. There, first byte 92 contains an opcode signifying a SNTDAT packet. The least significant bit 96 of second byte 94 contains the LP flag. The second bit 98 of byte 94 contains the sequence number flag, NS. The remaining bits of that byte must be 0 The next eight bytes, collectively labelled 100, contain a transaction identifier, XCT ID.

The next four bytes, collectively 102, contain the receive buffer name, REC NAME. They are followed by four other bits collectively labelled 104, which specify the receive buffer offset, REC OFFSET. The remaining bytes comprise a field 106 which contains the data being written.

Figure 12:
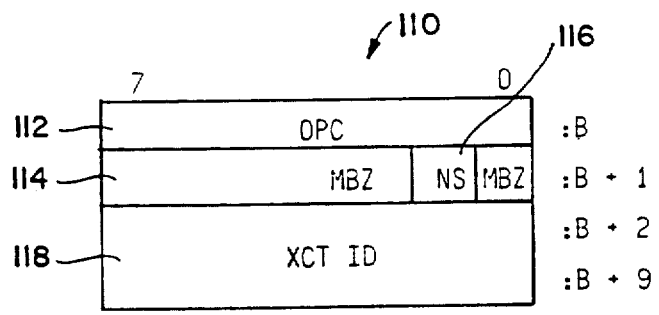
FIG. 12 is a diagrammatic illustration of the format of the body of a confirmation packet.
Figure 13:
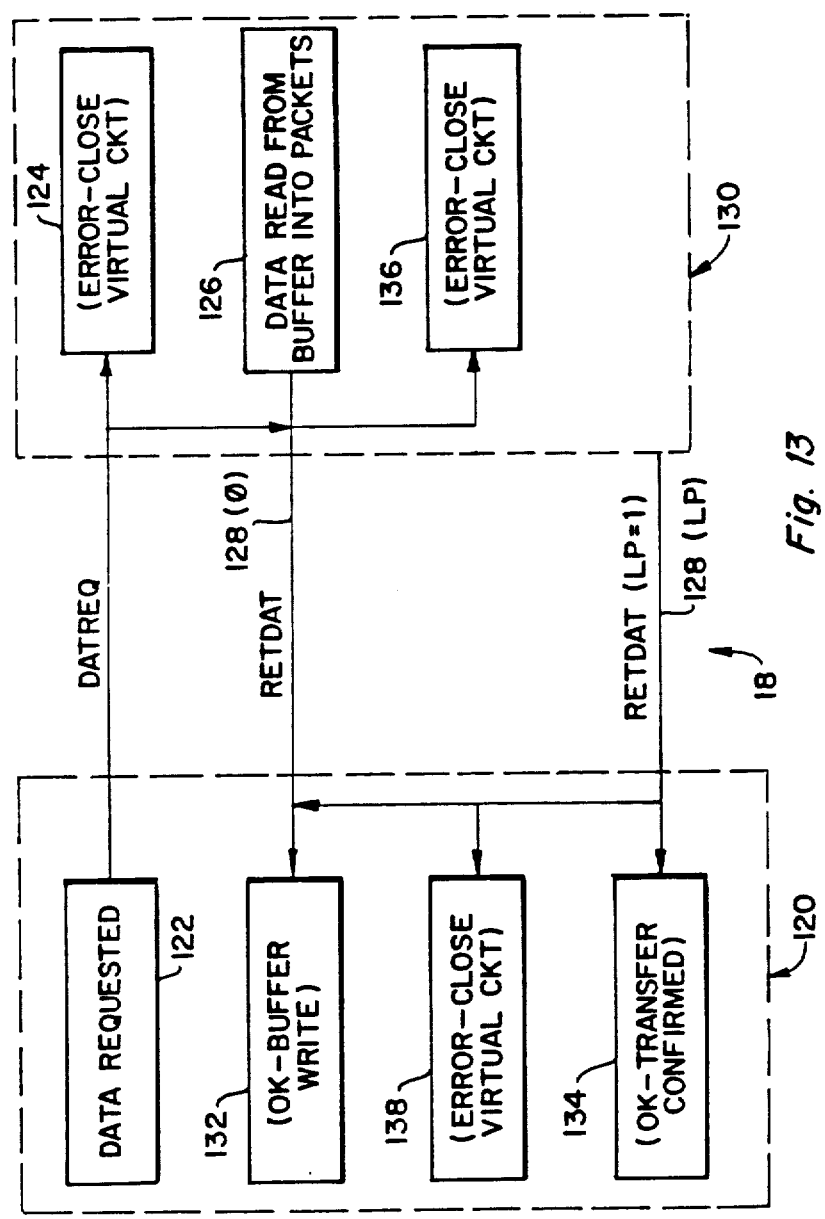
FIG. 13 is a flow diagram illustrating the process of returning (i.e., reading) data from another port.

The body format of a suitable CNF packet 110 is shown in FIG. 12. It starts with an opcode in the first byte, 112, signifying a CNF packet, and then is followed by a flags byte, 114, wherein all bits except the second bit 116 must be 0. Bit 116 contains the sequence number flag, NS, for the destination port. The next eight bytes comprise a transaction identifier field 118; it has the same value as the corresponding SNTDAT packet with the LP flag set that resulted in its generation.

READING DATA

As explained above, data is read from a remote node/port by requesting that the data be returned to the requester. The data read operation is illustrated in FIG. 12. The operation starts with the originating port 120 generating a Data Request (DATREQ) packet, step 122, which is sent by the bus 18 to the responding port 130 from which the data is to be read. The DATREQ packet specifies the names and offsets of buffers to supply and accept the data and the length of the transfer, in bytes. If there is an error detected, the virtual circuit is closed. (Step 124). Otherwise, the requested data is read from the buffers where it is stored in the memory of the port 130 into the packet buffers of that port, step 126, and then is transmitted as Return Data (RETDAT) packets 128(0) through 128 (LP), in much the same manner as data is sent in SNTDAT packets. The last RETDAT packet, 128(LP), is marked by the LP flag being set. Each RETDAT packet is buffered as it is received, step 132; and receipt of the LP flag confirms transfer success, step 134. Detection of an error in transmission, step 136, or in reception, step 138, causes closure of the virtual circuit and aborts the transfer.

The size of individual packets to be returned, except for the last packet, is specified in the request. The maximum allowable size must be determined by prior agreement between the involved ports, using a higher level protocol.

The priority for the data return operation is specified by the particular opcode value in the DATREQ packet.

Figure 14:
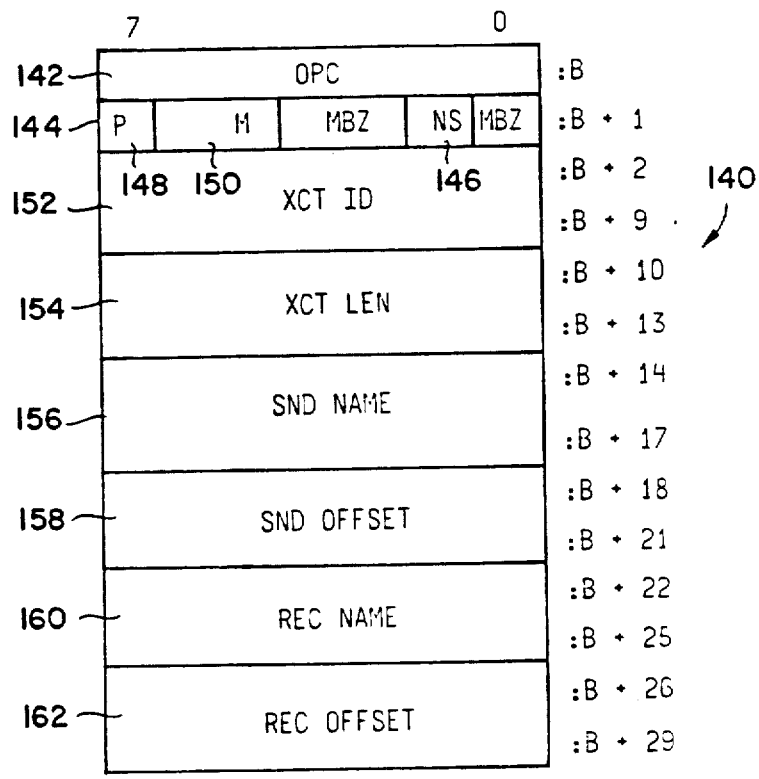
FIG. 14 is a diagrammatic illustration of the format of the body of a command for requesting (i.e., returning or reading) data from a remote port.

The body format of the DATREQ packets 140 is illustrated in FIG. 14. First byte 142 is, as usual, an opcode. As indicated, the opcode may vary with the priority level of the request. Second byte 144 is, as usual, the FLAGS byte. Bits 0, 2 and 3 of that byte must 0. Second bit 146 contains the NS flag. Most significant bit 148 contains the P flag indicating the basic packet size for return data transfers, where two basic packet sizes are available. For example, the user may be able to choose between 512 byte and 576 byte format; the P flag may be 0 to indicate 512 byte blocks and 1 to indicate 576 byte blocks. The M flag in a three-bit field 150 at bit positions 4-6 indicates the packet size multiple; packet data length is equal to the basic size determined by the P flag multiplied by the factor (M+1).

The next eight bytes 152 contain the transaction identifier XCT ID. This is followed by four bytes 154, which contain the transfer length in bytes, designated XCT LEN. This is followed by another four byte field 156, containing the name of the sending buffer, SND NAME.

The sending buffer offset, SND OFFSET is communicated in a four byte field 158. It is followed by another four byte field 160 containing the receive buffer name, REC NAME. This is followed the four-byte concluding field 162 which contains the buffer offset, REC OFFSET.

Figure 15:
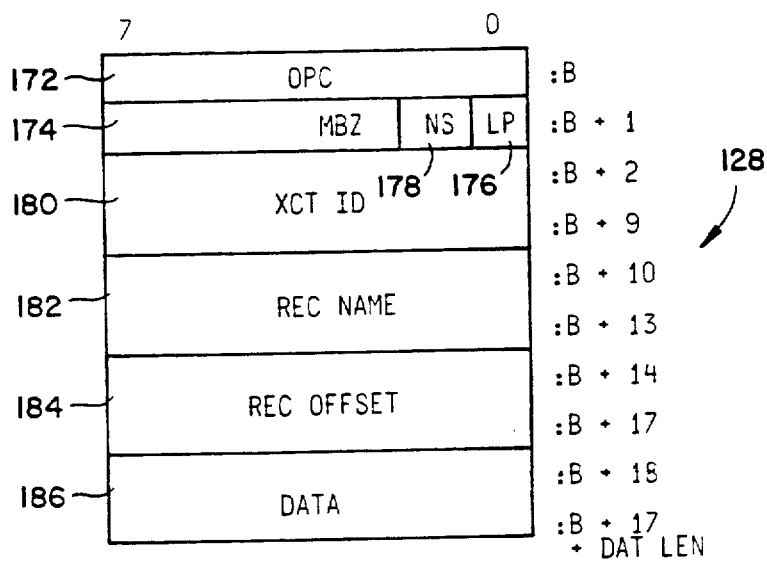
FIG. 15 is a diagrammatic illustration of the format of the body of a packet for data being returned.

The body format of a RETDAT packet 128 is illustrated in FIG. 15. It, of course, starts with a byte 172 containing an appropriate opcode. This is followed by a FLAGS byte 174 which has only two active bits. The least significant bit 176 contains the LP flag. It is only set in the last packet of the transfer. The next bit 178 indicates the Sequence Number flag, NS. The remaining bits of that byte must be 0. An eight byte field 180 contains the transaction identifier. This is followed by a four-byte field 182 naming the receiving buffer and another four-byte field 184 specifying the buffer offset for the packet. The concluding field 186 is of variable length and contains the data being returned.

The architectural elements of the port/port driver interconnection are illustrated in FIG. 16, wherein a port such as 26B and an associated port driver 23 of a host computer 22B, 24B utilize one or more command queues (of which only one, 202, is shown), a response queue 204, Datagram and Message Free queues 206 and 208, respectively, a buffer description table 210, a port queue block 212 and control status registers 214. This figure shows how this architecture facilitates remote execution of commands. Received message packets (e.g., packet 209) are loaded into the entries of Message Free queue 208 as they are received. A decoder 216 in port 26B looks at the opcode and steers the packet either to a command queue 202 or reposnse queue 204. Basically REQDAT and SNTDAT (LP) packets are steered to a command queue and other packets are steered to the response gueue. Decoder 216 may, of course, be a suitably programmed port processor.

Each queue entry contains a pair of "pointers"—one to the address of the preceding queue entry and one to the address of the next subsequent queue entry. These addresses need not be in any prearranged sequence. Neither does each queue have to be of predetermined size; by virtue of the use of the pointers, queue size may vary. In addition, each queue preferably includes an interlock device, such as one preassigned bit the value of which signifies that the queue is in use.

The foregoing description is limited to a single specific embodiment of this invention, but it will be apparent that this invention can be practiced in data processing systems having diverse basic construction or in systems using different internal circuitry or design while nevertheless achieving some or all of the foregoing objects and advantages of this invention. Therefore, it is the object of the appended claims to cover all such variations, modifications and obvious improvements as come within the true spirit and scope of this invention.

What is claimed as new and desired to be secured by Letter Patent of the United States is:

1. A digital data processing system including a source node and a destination node, each including a host computer, and a common bus, said source node further including a source buffer means for storing a block of information to be transferred, said source buffer means being identified by a source buffer name, and said destination node further including destination buffer means for receiving a block of information, said destination buffer being identified by a destination buffer name, and said destination node including means for identifying the name of the destination buffer means to the source node;

A. said source node further including:
    i. message assembly means connected to said source buffer means for assembling a packet comprising a plurality of fields including:
      (a) an information field including information from said source buffer means,
      (b) a packet type field containing a packet type that identifies the packet as containing information for the destination buffer means or as containing a command to be executed by said destination node,
      (c) a destination name field including the name of said destination buffer means,
    ii. source port means connected to said message assembly means and said common bus responsive to the generation of a packet by said message assembly means for transmitting the packet over said common bus
  B. said second node including:
    i. destination port means connected to said common bus for rceiving packets from said bus;

ii. means for selectively writing a received packet to the destination memory buffer comprising:
  (a) packet type decoding means for decoding the contents of the packet type field in the received packet to determine whether the packet contains information for the destination buffer means; and
  (b) directing means connected to said packet type decoding means responsive to the packet type decoding means determining that the packet contains information for the destination buffer means and further responsive to the contents of the destination name field for directing the contents of the packet to the identified destination buffer.

2. A data processing system as defined in claim 1 wherein each packet generated by said message assembly means includes an offset field whose contents identify an offset within the destination buffer into which the information in the information field is to be received, said directing means being further responsive to the contents of said offset field for directing the contents of the information field of the packet to the portion of said destination buffer identified by the contents of said offset field.

3. A data processing system as defined in claim 1 wherein said message assembly means includes means for generating a plurality of packets to transfer the information in said source buffer means, each packet generated by said message assembly means further including a last packet field which contains a last packet flag which is set when the packet is the last packet for the message.

4. A data processing system as defined in claim 3 wherein said destination port means further includes means for generating a confirmation packet for transmission to said source node in response to the receipt of a packet from said source node in which said last packet flag is set.

5. A data processing system as defined in claim 4 wherein each packet generated by said message assembly means further includes a packet sequence field whose contents relate to the number of the packet since the beginning of the message, said destination port means further including sequence counter means, comparison means responsive to the receipt of a packet for comparing the value from the sequence counter means to the contents of the packet sequence field to verify that the packet is the proper packet in the sequence, and incrementing means for incrementing said sequence counter means in response to the receipt of each packet to identify the sequence number of the next expected packet.

6. A data processing system as defined in claim 1 wherein the destination means further includes command execution means for executing a command when said packet type field indicates that the packet contains a command to be executed by said destination node.

7. A data processing system as defined in claim 6 wherein one command requests the destination node to send information from said destination buffer means to said source node, said source node further including source buffer means identified by a source buffer name, said source node including means for identifying the name of the source buffer means to the destination node, said destination node further including message assembly means connected to said destination buffer means for assembling a packet comprising a number of fields including:

A. an information field including information from said destination buffer means, and
B. a source name field including the name of said source buffer means,
said destination port means further including means connected to said message assembly means for transmitting the packets generated by said message assembly means over said common bus.

8. A data processing system as defined in claim 7 in which said source port means further includes means for receiving packets from the common bus and source node directing means connected to said source port means and responsive to the contents of the source name field for directing the contents of the packet to the identified source buffer means.

9. A data processing system as defined in claim 8 wherein said destination message assembly means includes means for generating a plurality of packets to transfer a message comprising the information in said destination buffer means, each packet generated by said message assembly means further including a last packet field which contains a last packet flag which is set when the packet is the last packet for the message.

10. A data processing system as defined in claim 9 wherein said source port means further includes means for generating a confirmation packet for transmission to said destination node in response to the receipt of a packet from said destination node in which said last packet flag is set.

11. A source node for connection to a common bus in a digital data processing system including a destination node connected to said common bus, each node including a host computer, and a common bus, said source node further including a source buffer means for storing a block of information to be transferred, said source buffer means being identified by a source buffer name, and said destination node further including destination buffer means for receiving a block of information, said destination buffer being identified by a destination buffer name, and said destination node including means for identifying the name of the destination buffer means to the source node, said source node further including:
  i. message assembly means connected to said source buffer means for assembling a packet comprising a plurality of fields including:
    (a) an information field including information from said source buffer means,
    (b) a packet type field containing a packet type that identifies the packet as containing information for the destination buffer means or as containing a command to be executed by said destination node,
    (c) a destination name field including the name of said destination buffer means, and
  ii. source port means connected to said message assembly means and said common bus responsive to the generation of a packet by said message assembly means for transmitting the packet over said common bus.

12. A source node as defined in claim 11 wherein each packet generated by said message assembly means further includes an offset field whose contents identify an offset within the destination buffer into which the information in the information field is to be received.

13. A source node as defined in claim 11 wherein said message assembly means includes means for generating a plurality of packets to transfer the information in said source buffer means, each packet generated by said message assembly means further including a last packet field which contains a last packet flag which is set when the packet is the last packet for the message.

14. A source node defined in claim 13 wherein each packet generated by said message assembly means further includes a packet sequence field whose contents relate to the number of the packet since the beginning of the message.

15. A source node as defined in claim 11 wherein one command requests the destination node to send information from said destination buffer means to said source node, said source node further including source buffer means identified by a source buffer name and means for identifying the name of the source buffer means to the destination node.

16. A source node as defined in claim 15 in which said destination node includes means for transmitting packets each including an information field and a source name field including the name of the source buffer means, said source port means further including means for receiving packets from the common bus and source node directing means connected to said source port means and responsive to the contents of the source name field for directing the contents of the packet to the identified source buffer means.

17. A source node as defined in claim 16 wherein said destination node generates messages comprising a plurality of packets each packet further including a last packet field which contains a last packet flag which is set when the packet is the last packet for the message, said source port means further including means for generating a confirmation packet for transmission to said destination node in response to the receipt of a packet from said destination node in which said last packet flag is set.

18. A destination node for connection to a digital data processing system including a source node, each including a host computer, and a common bus, said source node further including a source buffer means for storing a block of information to be transferred, said source buffer means being identified by a source buffer name, and said destination node further including destination buffer means for receiving a block of information, said destination buffer being identified by a destination buffer name, and said destination node further including means for identifying the name of the destination buffer means to the source node; said source node assembling a packet comprising a plurality of fields including (a) an information field including information from said source buffer means, (b) a packet type field containing a packet type that identifies the packet as containing information for the destination buffer means or as containing a command to be executed by said destination node and (c) a destination name field including the name of said destination buffer means and transmitting the packet over said common bus; said destination node further including:
  i. destination port means connected to said common bus for receiving packets from said bus;
  ii. means for selectively writing a received packet to the destination memory buffer comprising:
    (a) packet type decoding means for decoding the contents of the packet type field in the received packet to determine whether the packet contains information for the destination buffer means; and
    (b) means connected to said packet type decoding means responsive to the packet type decoding means determining that the packet contains information for the destination buffer means and further responsive to the contents of the destination name field for directing the contents of the packet to the identified destination buffer.

19. A destination node as defined in claim 18 wherein each packet includes an offset field whose contents identify an offset within the destination buffer into which the information in the information field is to be received, said directing means being further responsive to the contents of said offset field for directing the contents of the information field of the packet to the portion of said destination buffer identified by the contents of said offset field.

20. A destination node as defined in claim 18 wherein said source node generates messages comprising a plurality of packets to transfer the information in said source buffer means, each packet further including at last packet field which contains a last packet flag which is set when the packet is the last packet for the message, said destination port means further including means for generating a confirmation packet for transmission to said source node in response to the receipt of a packet from said source node in which said last packet flat is set.

21. A destination node as defined in claim 20 wherein each packet generated by said source node further includes a packet sequence field whose contents relate to the number of the packet since the beginning of the message, said destination port means further including sequence counter means, comparison means responsive to the receipt of a packet for comparing the value from the sequence counter means to the contents of the packet sequence field to verify that the packet is the proper packet in the sequence, and incrementing means for incrementing said sequence counter means in response to the receipt of each packet to identify the sequence number of the next expected packet.

22. A destination node as defined in claim 21 wherein the destination means further includes command execution means for executing a command when said packet type field indicates that the packet contains a command to be executed by said destination node.

23. A destination node as defined in claim 22 wherein one command requests the destination node to send information from said destination buffer means to said source node, said source node further including source buffer means identified by a source buffer name, said source node including means for identifying the name of the source buffer means to the destination node, said destination node further including message assembly means connected to said destination buffer means for assembling a packet comprising a number of fields including:
  A. an information field including information from said destination buffer means, and
  B. a source name field including the name of said source buffer means,
  said destination port means further including means connected to said message means for transmitting the packets generated by said message assembly means over said common bus.

24. A destination node as defined in claim 23 wherein said destination message assembly means includes means for generating a message comprising a plurality of packets to transfer the information in said destination buffer means, each packet generated by said message assembly means further including a last packet field which contains a last packet flat which is set when the packet is the last packet for the message.

25. A node for connection to digital data processing system including a plurality of nodes, each including a host computer, attached to a common bus, said node further including a source buffer means for storing a block of information to be transferred, said source buffer means being identified by a source buffer name, and destination buffer means for receiving a block of information, said destination buffer means identified by a destination buffer name; said data processing system further including at least one other node also including a destination buffer means identified by a destination buffer name and means for identifying the destination buffer names to all of said nodes, said node further including:
- A. source means comprising:
  - i. message assembly means connected to said source buffer means for assembling a packet comprising a plurality of fields including:
    - (a) an information field including information from said source buffer means,
    - (c) a packet type field containing a packet type that identifies the packet as containing information for the destination buffer means or as containing a command to be executed by said destination node
    - (b) a destination name field including the name of a destination buffer means,
  - ii. source port means for connection to said message assembly means and said common bus responsive to the generation of a packet by said message assembly means for transmitting the packet over said common bus;
- B. destination means comprising:
  - i. destination port means for connection to said common bus for receiving packets from said bus;
  - ii. means for selectively writing a received packet to the destination memory buffer comprising:
    - (a) packet type decoding means for decoding the contents of the packet type field in the received packet to determine whether the packet contains information for the destination buffer means; and
    - (b) means connected to said packet type decoding means responsive to the packet type decoding means determining that the packet contains information for the destination buffer means and further responsive to the contents of the destination name field for directing the contents of the packet to the identified destination buffer.

26. A node as defined in claim 25 wherein each packet includes an offset field whose contents identify an offset within the destination buffer into which the information in the information field is to be received, said directing means being further responsive to the contents of said offset field for directing the contents of the information field of the packet to the portion of said destination buffer identified by the contents of said offset field.

27. A node as defined in claim 25 wherein said message assembly means includes means for generating a plurality of packets to transfer the information in said source buffer means, each packet generated by said message assembly means further including a last packet field which contains a last packet flag which is set when the packet is the last packet for the message.

28. A node as defined in claim 27 in which at least one other node in said data processing system generates and transmits messages including packets each of which includes a last packet flag which is set when the packet is the last packet for the message, said destination port means further including means for generating a confirmation packet for transmission in response to the receipt of a packet in which said last packet flag is set.

29. A node as defined in claim 28 wherein each packet generated by said message assembly means further includes a packet sequence field whose contents relate to the number of the packet since the beginning of the message.

30. A node as defined in claim 29 wherein at least one other node in said data processing system generates and transmits messages including packets each of which includes a packet sequence field whose contents relate to the number of the packet since the begining of the message, said destination port means further including sequence counter means, comparison means responsive to the receipt of a packet for comparing the value from the sequence counter means to the contents of the packet sequence field to verify that the packet is the proper packet in the sequence, and incrementing means for incrementing said sequence counter means in response to the receipt of each packet to identify the sequence number of the next expected packet.

31. A node as defined in claim 25 wherein the destination means further includes command execution means for executing a command when said packet type field indicates that the packet contains a command to be executed.

32. A node as defined in claim 31 wherein one command requests the node to send information from said destination buffer means to the commanding node which sent the command, said commanding node further including commanding buffer means identified by a command buffer name, said commanding node including means for identifying the name of the commanding buffer means to the node, said node further including message assembly means connected to said destination buffer means for assembling a packet comprising a number of fields including:
- A. an information field including information from said destination buffer means, and
- B. a commanding name field including the name of said commanding buffer means,
- said destination port means further including means connected to said message assembly means for transmitting the packets generated by said message assembly means over said common bus.

33. A node as defined in claim 32 in which the data processing system includes at least one node generates and transmits packets in response to the receipt of a command including an information field and a commanding name field, said source port means further including means for receiving packets from the common bus and source node directing means connected to said source port means and responsive to the contents of the source name field for directing the contents of the packet to the identified source buffer means.

34. A node as defined in claim 33 wherein said destination message assembly means includes means for generating a plurality of packets to transfer the information in said destination buffer means, each packet generated by said message assembly means further including a last packet field which contains a last packet flag which is set when the packet is the last packet for the message.

35. An interface unit for connection to a host digital computer system and a common bus in a digital data processing system, said host computer including processor unit means and memory means, said interface unit generating packets for transmitting information over said common bus and receiving packets containing information from said common bus and comprising:
- A. interface means for connection to said common bus for transmitting packets over and receiving packets from said common bus;
- B. storage means connected to said interface means and for connection to said memory means, said storage means containing a plurality of storage locations for storing information from said memory means and for storing packets received by said interface means; and
- C. port processor means connected to said interface means and said storage means and for connection to said processor unit means responsive to commands from said processor unit means, said port processor means including:
  - i. information retrieval means for connection to said memory means and said storage means for enabling information to be transferred from said memory means to said storage means,
  - ii. message assembly means connected to said storage means for generating a message comprising at least one packet including a plurality of fields including (a) an information field including information from said buffer means, (b) a packet type field containing a packet type that identifies the packet as containing information or as containing a command to be executed and (c) a destination name field identifying the node to receive the packet,
  - iii. transmission enabling means connected to said message assembly means and said interface means for enabling said interface means to transmit the assembled message over said common bus, and
  - iv. control means for connection to said processor unit means and connected to said information retrieval means, said message assembly means, and said transmission enabling means for receiving commands from said processor unit means for enabling each said means in response to commands from said processor unit means.

36. An interface unit as defined in claim 35 wherein said interface means transmits packets to the other nodes and receives packets from other nodes over said common bus using a virtual circuit protocol, said port processor means further comprising virtual circuit descriptor table means comprising a plurality of entries each associated with one virtual circuit, each entry including circuit state means identifying the state of the virtual circuit, send sequence number means identifying a sequence number of packets sent over the virtual circuit, receive sequence number means identifying a sequence number of packets received over the virtual circuit, and path status means indicating the operability of the common bus.

37. An interface unit as defined in claim 35 wherein said memory means includes a plurality of buffers each having a name, packets received from said common bus having a name field containing a buffer name, said port processor means further including means responsive to the receipt of a packet for using the contents of the name field of each packet for enabling information in said packet to be transferred to the buffer named in the packet.

* * * * *